United States Patent
Nagai (10) Patent No.: US 7,369,475 B2
(45) Date of Patent: May 6, 2008

(54) OPTICAL DISC, INFORMATION PLAYBACK APPARATUS, INFORMATION PLAYBACK METHOD, AND INFORMATION RECORDING METHOD

(75) Inventor: Koichi Nagai, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 590 days.

(21) Appl. No.: 10/988,572

(22) Filed: Nov. 16, 2004

(65) Prior Publication Data

US 2005/0105429 A1 May 19, 2005

(30) Foreign Application Priority Data

Nov. 18, 2003 (JP) .............................. 2003-388118

(51) Int. Cl.
*G11B 7/00* (2006.01)
(52) U.S. Cl. .................. 369/53.27; 369/83; 369/59.25
(58) Field of Classification Search ............. 369/275.3, 369/275.4, 44.26, 53.22, 53.27, 47.41, 59.25, 369/83, 84
See application file for complete search history.

(56) References Cited

U.S. PATENT DOCUMENTS 6,915,374 B2 * 7/2005 Pereira ........................... 711/5
7,193,959 B2 * 3/2007 Lee et al. ................. 369/275.3

FOREIGN PATENT DOCUMENTS

JP 2002-56543 2/2002
KR 10-2005-0017552 2/2005

OTHER PUBLICATIONS

"120 mm (4,7 Gbytes per side) and 80 mm (1,46 Gbytes per side) DVD Rewritable Disk (DVD-RAM)", Standard ECMA-330, 2nd Edition, Jun. 2002.

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical disc according to one aspect of this invention has a first field to record first version information, and a second field to record second version information obtained by updating the first version information.

9 Claims, 9 Drawing Sheets

| BP | Contents |
|---|---|
| 0 | Book type and Compatible Part version |
| 1 | Disc size and maximum transfer rate of the disc |
| 2 | Disc structure |
| 3 | Recording density |
| 4-15 | Data area allocation |
| 16 | BCA descriptor |
| 17 | Revision number of maximum recording speed |
| 18 | Revision number of minimum recording speed |
| 19-25 | Revision number table of recording speed |
| 26 | Class |
| 27 | Extended Part version |
| 28-31 | Reserved |
| 32 | Disc type identificationon |
| 23-499 | Reserved |
| 500 | Velocity |
| 501 | Read power |
| 502 | Mode flag of adaptive write pulse control |
| 503 | Peak power for land tracks |
| 504 | Bias power 1 for land tracks |
| 505 | Bias power 2 for land tracks |
| 506 | Bias power 3 for land tracks |
| 507 | Peak power for groove tracks |
| 508 | Bias power 1 for groove tracks |
| 509 | Bias power 2 for groove tracks |
| 510 | Bias power 3 for groove tracks |
| 511 | First pulse end time |
| 512 | First pulse duration |
| 513 | Multi pulse duration |
| 514 | Last pulse start time |
| 515 | Last pulse duration |
| 516 | Bias power 2 duration |

FIG. 4

| BP | Contents |
|---|---|
| 517 | First pulse start time, Mark 3T, Leading Space 3T |
| 518 | First pulse start time, Mark 4T, Leading Space 3T |
| 519 | First pulse start time, Mark 5T, Leading Space 3T |
| 520 | First pulse start time, Mark >5T, Leading Space 3T |
| 521 | First pulse start time, Mark 3T, Leading Space 4T |
| 522 | First pulse start time, Mark 4T, Leading Space 4T |
| 523 | First pulse start time, Mark 5T, Leading Space 4T |
| 524 | First pulse start time, Mark >5T, Leading Space 4T |
| 525 | |
| 526 | |
| 527 | |
| 528 | |
| 529 | |
| 530 | |
| 531 | |
| 532 | |
| 533 | Last pulse end time, Mark 3T, Trailing Space 3T |
| 534 | Last pulse end time, Mark 4T, Trailing Space 3T |
| 535 | |
| 536 | |
| 537 | |
| 538 | |
| 539 | |
| 540 | |
| 541 | |
| 545 | |
| 546 | |
| 547 | |
| 548 | |
| 549-596 | |
| 597-612 | |
| 613-623 | |
| 624-699 | |
| 700-757 | |
| 758-2047 | Reserved |

OPTICAL DISC, INFORMATION PLAYBACK APPARATUS, INFORMATION PLAYBACK METHOD, AND INFORMATION RECORDING METHOD

CROSS-REFERENCE TO RELATED APPLICATIONS

This application is based upon and claims the benefit of priority from prior Japanese Patent Application No. 2003-388118, filed Nov. 18, 2003, the entire contents of which are incorporated herein by reference.

BACKGROUND OF THE INVENTION

1. Field of the Invention

The present invention relates to an optical disc such as a DVD or the like. The present invention also relates to an information playback apparatus and information playback method for playing back information from such optical discs. Furthermore, the present invention relates to an information recording method for recording information on such optical discs.

2. Description of the Related Art

As described in Jpn. Pat. Appln. KOKAI Publication No. 2002-056543, optical discs with large recording capacities such as a DVD-RAM, DVD-R, DVD-RW, and the like have been developed and are in wide use. Such optical discs have a Part Version field indicating a version of a standard based on which that disc was prepared.

The Part Version field records a version number in the format of X.Y. A digit is assigned to each of X and Y. As a result, a version number such as 1.1, 2.1, 2.2, or the like is expressed.

At first, the Part Version field is set for the purpose of simply indicating the version of the standard. Hence, no rules are specified upon upgrading. For this reason, interpretation of the Part Version field by early disc drives is not coordinated. For example, early optical disc drives include models which do not check the version number in the Part Version field at all, and models which do not accept a disc if a number other than a specific version number is recorded in the Part Version field.

At present, upgrading rules are specified. The X value described in the Part Version field is changed if the latest version is incompatible with conventional discs. On the other hand, the Y value is changed if the latest version is compatible with conventional discs and a new specification is added. This additional specification is often incompatible with conventional discs.

Furthermore, in order to implement high-speed recording on DVD-RAM, DVD-R, and DVD-RW as recording media, specifications for high-speed recording are added. Such additional specifications for high-speed recording are compatible with the conventionally specified recording speeds. That is, an optical disc for which additional specifications for high-speed recording are specified is compatible with the conventional recording speeds and also new recording speeds.

Such an additional specification for high-speed recording is that which should change the Y value in terms of rules. However, it is troublesome to change Y by adding a new page to an existing standard every time a compatible recording speed is added. In consideration of this, an option BOOK is independently issued in association with recording speeds, and the version of this option BOOK is managed by a Revision number.

This is because optical disc drives which are already on the market often cannot handle new discs although they have compatibility, if Y is changed. Note that the Revision number adopts a format of A.B. However, this Revision number is not described on the disc.

Recently, discs which allow recording/playback at higher speed have been developed. As a result, it is difficult to manufacture discs which can achieve both recording at initially specified speeds and latest high-speed recording. In such case, an optical disc which is compatible with latest high-speed recording becomes incompatible with old discs. Hence, according to the conventional rules, the X value recorded on the Part Version field of an optical disc which is compatible with the latest high-speed recording is changed. However, since the X value is changed, a conventional optical disc drive which can perform only playback of an optical disc compatible with the latest high-speed recording can no longer perform playback in practice.

In practice, even when information is recorded at a conventional slowest speed by constraint on a disc compatible with the latest high-speed recording, data on the disc is never destroyed. Hence, the upgrading rule is changed, and the X value is changed if a change that does not allow playback is added.

Even when such rule change is to be made, some optical disc drives cannot perform any recording if the Y value is changed. In some cases, some optical disc drives cannot perform any playback if the Y value is changed. For this reason, the Y value cannot be changed if a specification that does not impair compatibility is made.

For this reason, the optical disc drive cannot detect any change in specification from the version information even when the specifications have changed. Also, as for the standard, if a specification is added without changing the version number, a change in standard can hardly be understood. Hence, a problem may be posed upon designing a drive that handles discs based on old specifications.

BRIEF SUMMARY OF THE INVENTION

An optical disc according to one aspect of the present invention comprises a first field to record first version information, and a second field to record second version information obtained by updating the first version information.

An information playback apparatus according to one aspect of the present invention is directed to an information playback apparatus for playing back information from an optical disc comprising a first field to record first version information, and a second field to record second version information obtained by updating the first version information, comprising a read unit configured to read information from the first and second fields, an interpretation unit configured to interpret the information read by the read unit, and a setting unit configured to set physical parameters on the basis of the second version information, if it is determined that the information read from the second field represents the second version information.

An information playback method according to one aspect of the present invention is directed to an information playback method for playing back information from an optical disc comprising a first field to record first version information, and a second field to record second version information obtained by updating the first version information, comprising reading information from the first and second fields, interpreting the read information, and setting, if it is determined that the information read from the second field represents the second version information, physical parameters on the basis of the second version information.

An information recording method according to one aspect of the present invention is directed to an information playback method for recording information on an optical disc comprising a first field to record first version information; and a second field to record second version information obtained by updating the first version information, comprising reading information from the first and second fields, interpreting the read information, and setting, if it is determined that the information read from the second field represents the second version information, physical parameters on the basis of the second version information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

An embodiment of the present invention will be described hereinafter with reference to the accompanying drawings.

Figure 1:
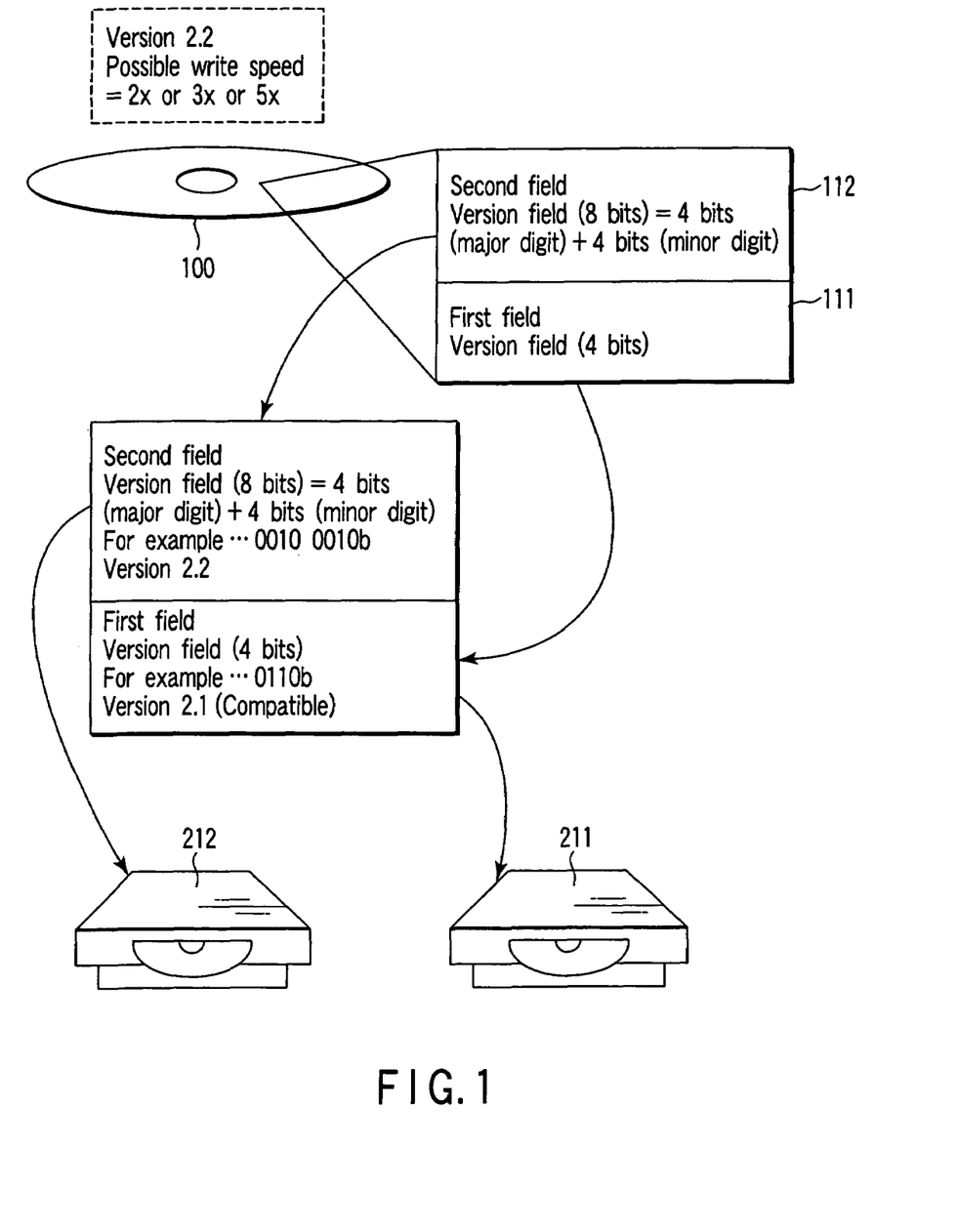
FIG. 1 shows an example of the basic concept of the present invention.

The concept of the present invention will be explained first. An optical disc 100 (e.g., DVD-RAM) shown in FIG. 1 is a disc which has been improved to have the capability of data writing at 3× and 5× speeds in addition to a 2× speed, comprises a second field in addition to a first field, and has the specification of Version 2.2. For example, (X.Y)=(2.1) is recorded in the first field, and (X.Y)=(2.2) is recorded in the second field.

The optical disc 100 has a lead-in area Lin. This lead-in area Lin includes an embossed data zone, mirror zone, and rewritable zone. The embossed data zone includes a control data zone.

The control data zone includes a first field (also called a version field) 111 and a second field (also called a version field) 112. The first field 111 can record 4-bit information indicating a version. Also, the second field 112 can record 8-bit information indicating a version.

The first field 111 records version information by a bit string such as "0000", "0010b", "0011b", "0100b", or the like. Meanings of these bit strings will be explained later. Also, the second field 112 records version information by a bit string such as "0010 0010b", "0010 0001b", or the like. Meanings of these bit strings will be explained later.

A recording/playback apparatus 211 which is incompatible with a new version is arranged to be able to recognize the contents (version information) of the first field 111 but not to recognize the contents (version information) of the second field 112.

By contrast, a recording/playback apparatus 212 which is compatible with a new version is arranged to recognize the contents (version information) of the second field 112 and also the contents (version information) of the first field 111.

As described above, according to the present invention, a field indicating new Part Version is added as the second field 112 upon adding a specification. The latest version is indicated by this new field. The old Part Version is defined to indicate an old compatible version. The second field 112 is assured on a reserved area in the conventional format. Note that the DVD standards include that for physical specifications and that for a file format. The standard for the physical specifications is defined as Part1, and that for the file format is defined by Part2. That is, "Part" of Part Version indicates the standard for the physical specifications or file format.

Normally, 00h is recorded on a reserved area. The recording/playback apparatus is set to ignore the reserved area irrespective of the value of the reserved area. The second field 112 (new Part Version field) of the disc of this embodiment (a disc of a new version) records information other than 00h, i.e., version information.

Therefore, the recording/playback apparatus which is prepared based on the conventional specifications ignores the contents of the second field 112 and handles the version of the compatible disc which is described in the first field 111 (conventional Part Version field as an original version, thus performing the operation according to that value.

The optical disc 100 shown in FIG. 1 allows, e.g., 2×, 3×, and 5× write processes. Such optical disc 100 is compatible with a conventional system, but some specifications are added and are often incompatible with the conventional system. That is, by ignoring the added specifications, the disc 100 can be similarly handled as a conventional disc. Therefore, the first field 111 describes "0110" that means compatibility to version 2.1

The conventional recording/playback apparatus 211 which cannot recognize the second field 112 ignores the second field 112, recognizes the version information of the first field 111, and can record or play back information on or from the disc like that of an old version.

On the other hand, the new recording/playback apparatus 212 that can recognize the second field 112 reads and recognizes the version information in the second field 112. The new recording/playback apparatus 212 can handle the disc according to newly added specifications so as to execute recording/playback processes.

In other words, the recording/playback apparatus which is prepared based on the conventional standard ignores the contents of the second field 112 (new field) and handles the version of the compatible disc described in the first field 111 (conventional field) as an original version, thus performing operations according to that value.

The new recording/playback apparatus 212 tries to read information in the second field 112. If a value is described in this field, the apparatus 212 handles this value as version information. If no value is described, the apparatus 212 tries to read information in the first field 111 and can handle a value described in this field as version information.

In this way, the second field 112 is interpreted by only the recording/playback apparatus which is prepared based on a new standard. That is, upon creating a new standard, revision rules of Part Version are precisely determined, and a method of handling these rules is defined. After that, a new specification can be added to the standard regardless of compatibility to a conventional drive. Also, the version of the standard can be easily managed. The recording/playback apparatus can easily discriminate discs. Since different version information contents are described in discs of different specifications, the user can easily recognize them.

In the manufacture of a new disc, when a specification which is compatible with an old version is added, the version number described in the first field 111 cannot be updated in association with the compatibility to the conventional recording/playback apparatus. That is, the new recording/playback apparatus cannot determine the original specifications of the disc on the basis of the version number described in the first field 111. However, when the disc described in this embodiment is applied, the new version can be described in the second field 112. In this way, the specifications of the discs can be easily identified.

More specifically, when the present invention is applied to upgrading rules that must be changed, the first field 111 indicates a version based on the conventional rule, and the second field 112 can indicate a version based on the new rule. That is, rules can be easily changed. Hence, the new recording/playback apparatus can recognize correct disc specifications.

When version interpretation in the conventional recording/playback apparatus does not match the upgrading rules, and it becomes impossible to upgrade the disc according to the original version rules, if the present invention is applied, the disc can be upgraded according to the original rules. Hence, the new recording/playback apparatus can recognize correct disc specifications.

The optical disc of the above embodiment is the optical disc 100 of the new version, which allows the existing recording/playback apparatus to record or read information.

Figure 2:
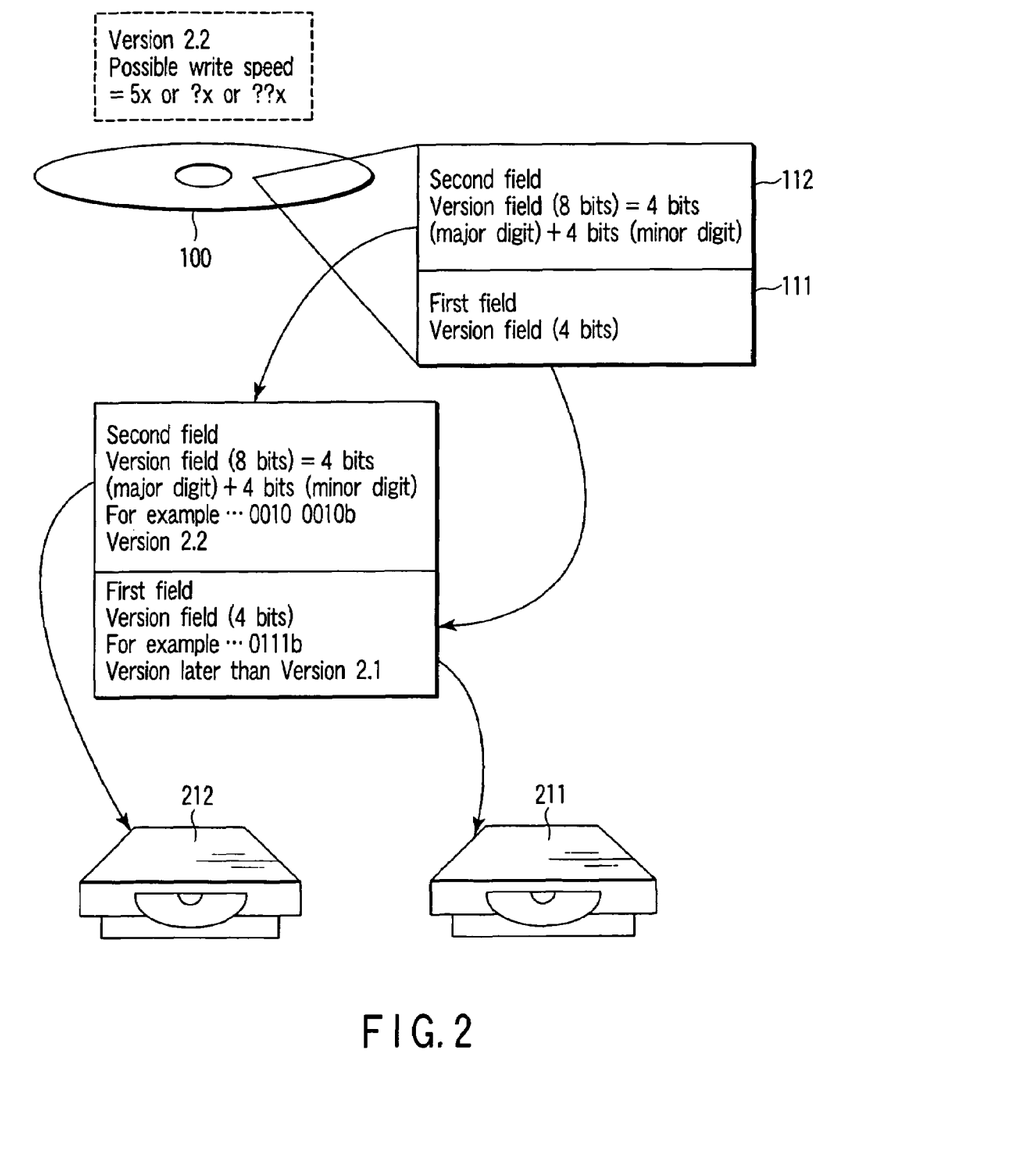
FIG. 2 shows another example of the basic concept of the present invention.

FIG. 2 shows an example of an optical disc 101 which allows only a new recording/playback apparatus to record information. In the case of the optical disc 101, the first field describes "0111b". In this case, when this disc 101 is loaded into the conventional recording/playback apparatus 211, the apparatus 211 reads the version information of the optical disc 101 and determines that "0111b" is undefined information. In such case, the recording/playback apparatus 211 ejects that optical disc, displays a warning message, or generates a warning tone. That is, since the conventional recording/playback apparatuses include those which were manufactured before the upgrading rules had been changed, they often perform such operations upon checking, although such operations are not standardized.

Figure 3A:
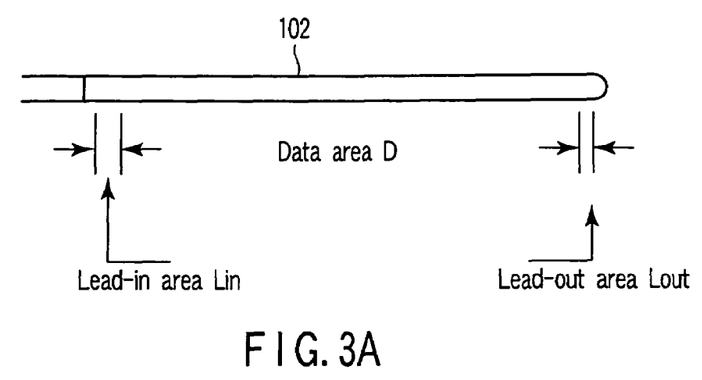
FIG. 3A shows the side surface of an optical disc according to an embodiment of the present invention.
Figure 3B:
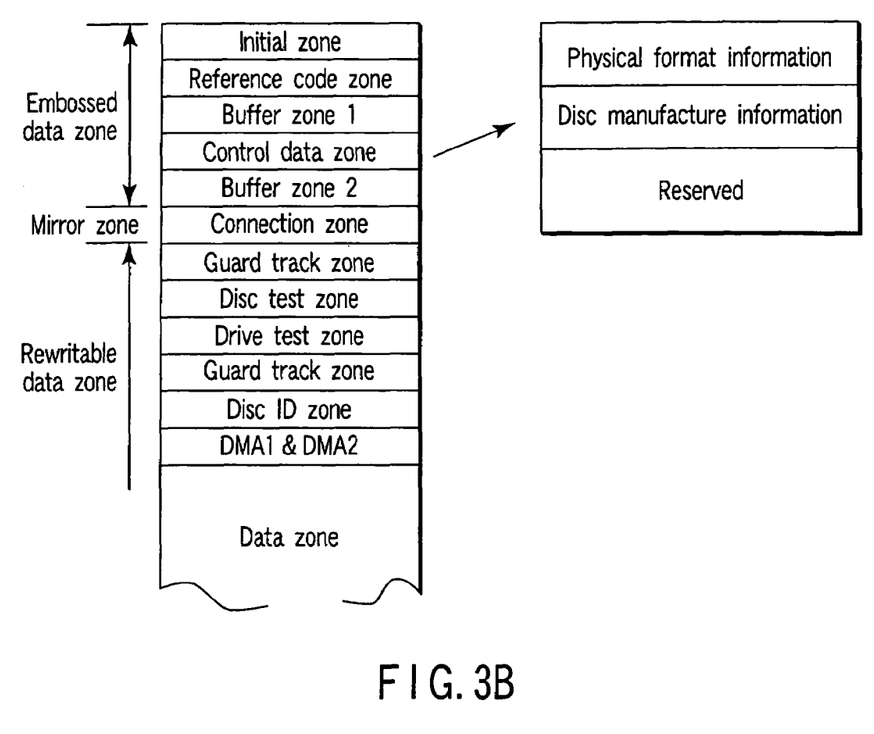
FIG. 3B shows the data structure of a lead-in area of the optical disc according to the embodiment of the present invention.

The structure of the optical disc according to the present invention will be described below as a general concept. As shown in FIG. 3A, an optical disc 102 has a lead-in area Lin, data area D, and lead-out area Lout. On the lead-in area Lin, for example (in case of a DVD-RAM), an information recording area is assured, as shown in FIG. 3B. The information recording area is roughly classified into an embossed data zone, mirror zone, and rewritable data zone, which are formed in turn on the inner periphery side of the disc. The embossed data zone includes an initial zone (00h), a reference code zone (one ECC block and a sector number 192512 (starting from 02 F000h)), a buffer zone (including 496 sectors (for 31 ECC blocks)), a control data zone (including 192 ECC blocks), and a buffer zone (including 496 sectors (for 31 ECC blocks)). In the case of other media of the DVD family, i.e., DVD-ROM, DVD-R, and DVD-RW, the lead-in area includes a control data zone although the lead-in area structure is different.

Figure 4:
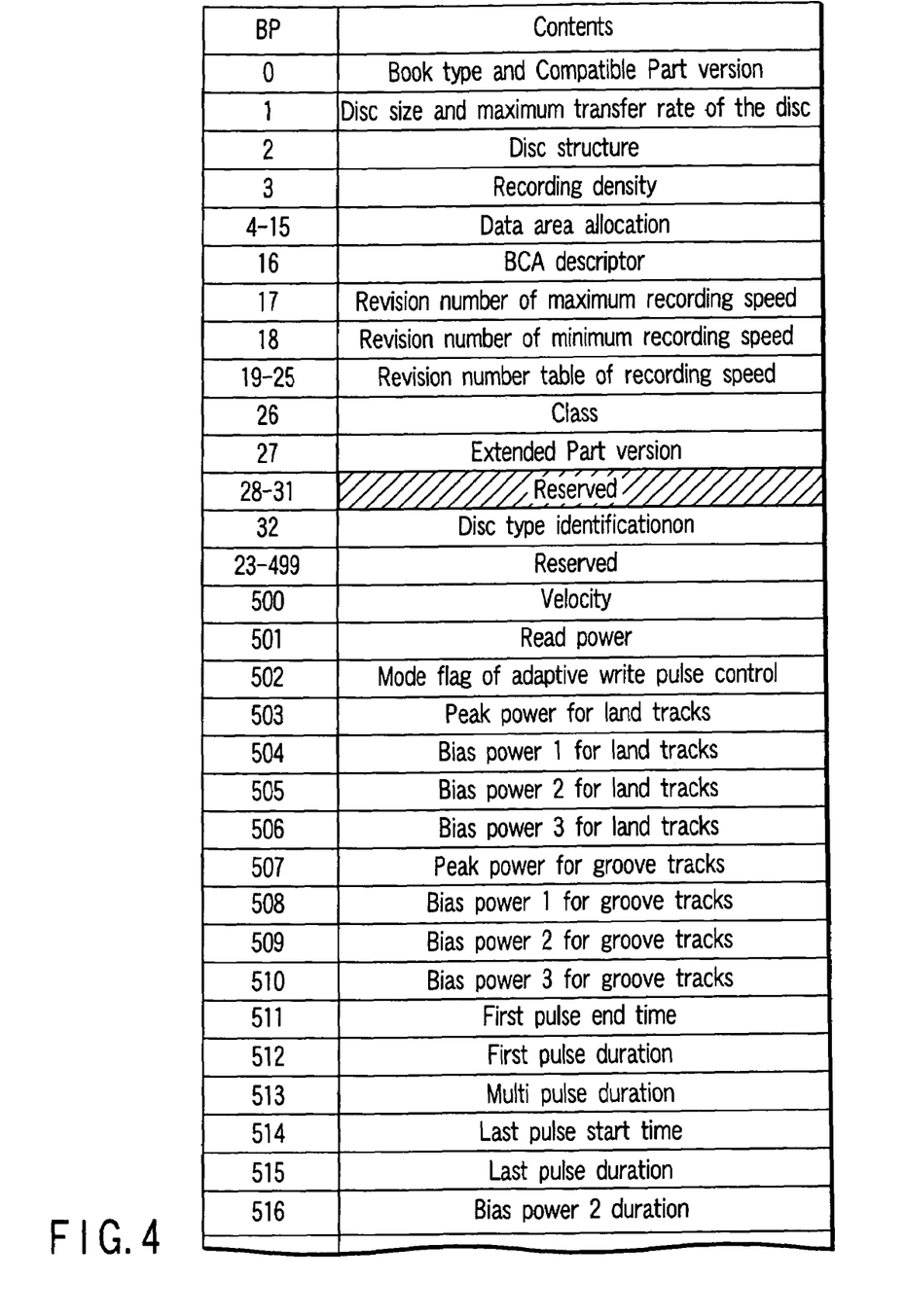
FIG. 4 shows the data structure (first half) of a physical format in the lead-in area of the optical disc according to the embodiment of the present invention.

Generally, the control data zone further has a physical format information area, disc manufacture information area, and reserved area. FIG. 4 shows various kinds of information described in the physical format information area. Information and meanings of respective fields will be described below.

A Book type and Part version field is as follows.

The Book type indicates a DVD-RAM if it is 0001b; a DVD-ROM if it is 0000b; and a DVD-R if it is 0010b. The Part version means version 2.0 if it is 0101b; version 0.9 if it is 0000b; version 1.0 if it is 0001b; and version 1.9 if it is 0100b.

A Disc size and maximum transfer rate of the disc field is as follows. If the former 4 bits of the disc size are 0000b, it means a 12-cm disc; if they are 0001b, it means an 8-cm disc. If the latter 4 bits of the disc size are 1111b, it means that no maximum transfer rate is specified; if they are 0000b, it means 2.52 Mbps; if they are 0001b, 5.04 Mbps; and if they are 0010b, 10.08 Mbps.

In a Disc structure field, bits b0 to b7 are allocated. Respective bits are assigned as follows. Bit b7 is reserved. Bits b6 and b5 indicate that the number of layers is single, if they are 00b. Bit b4 is a track path, and is reserved. Bit b3 is reserved. Bit b2 means that no rewritable user data area is included if it is 0b, or it means that a rewritable user data area is included if it is 1b. Bit b1 means that no recordable user data area is included if it is 0b, or it means that a recordable user data area is included if it is 1b. Bit b0 means that no embossed user data area is included if it is 0b, or it means that an embossed user data area is included if it is 1b.

Bits b0 to b3 of a Recording density field record information of the track density, and b4 to b7 record information of the linear density. If the information of the track density is "0000b", it means 0.74 µm/track; if it is "0001b", it means 0.80 µm/track; or if it is "0010b", it means 0.615 µm/track. If the information of the linear density is "0000b", it means 0.267 µm/bit; if it is "0001b", it means 0.293 µm/bit; if it is "0010b" it means 0.409 to 0.435 µm/bit; or if it is "0100b", it means 0.280 to 0.291 µm/bit.

A Data area allocation field describes the start sector number and end sector number of a data area, and the like. A BCA descriptor field describes the presence/absence of BCA.

Byte positions 17 to 26 are reserved, and an Extended part version as a characteristic feature of the present invention is allocated at byte position 27. That is, this byte position 27 corresponds to the aforementioned second field 112. The aforementioned control data zone corresponds to the first field 111 described above.

Figure 5:
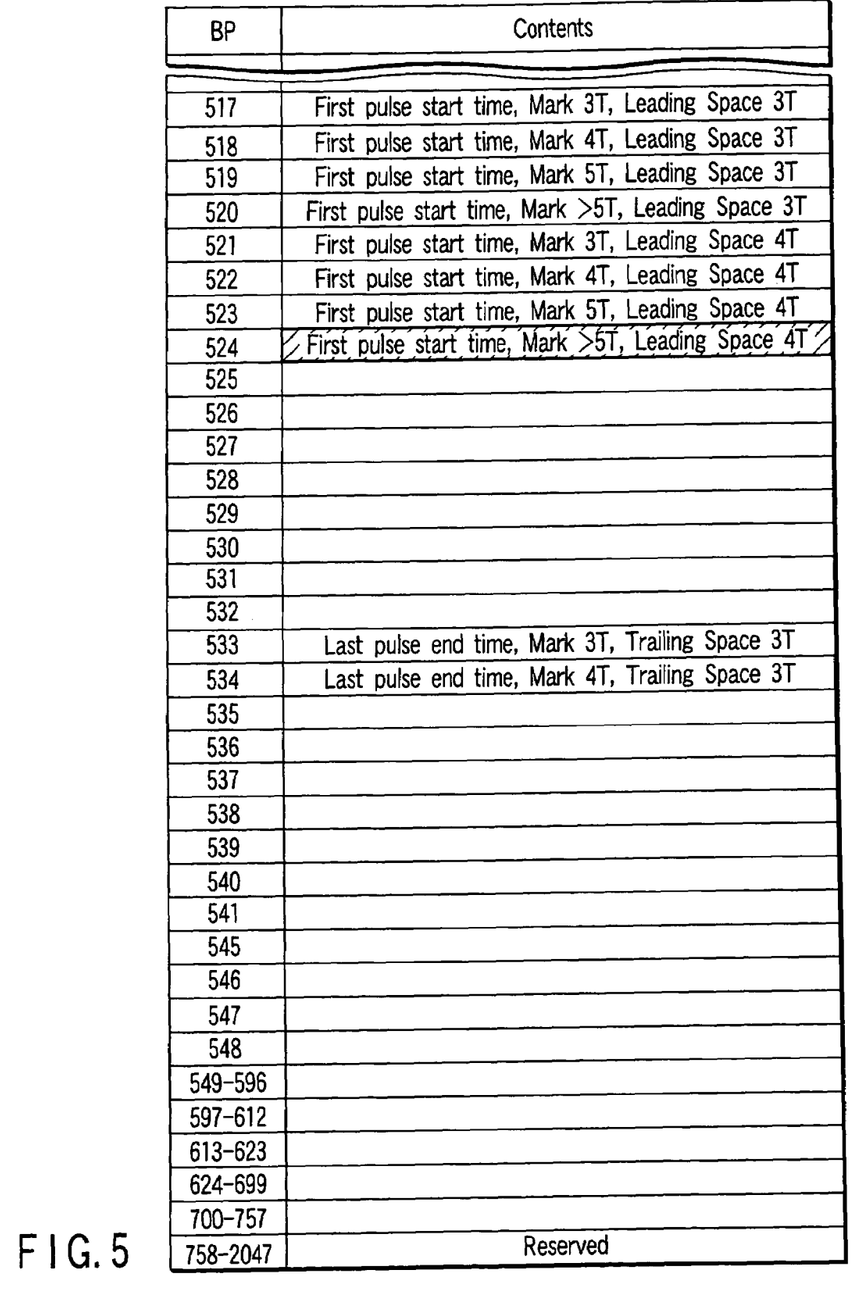
FIG. 5 shows the data structure (second half) of the physical format in the lead-in area of the optical disc according to the embodiment of the present invention.

The contents described in the second field will be described later. Byte positions 0 to 31 are fields common to the DVD family. A portion from byte position 32 is unique to a DVD-RAM and records various parameters unique to the DVD-RAM. A disc type ID field stores information used to identify if a disc is of type stored in a case. A Velocity field stores information of the linear velocity (e.g., 8.2 m/s). A Read power field stores information of the read power (e.g., 1.0 mW). In the subsequent fields, information of physical parameters to be set upon writing or reading out information on or from this disc is described, as shown in FIGS. 4 and 5. Note that a description of blank byte positions will be omitted.

Figure 6:
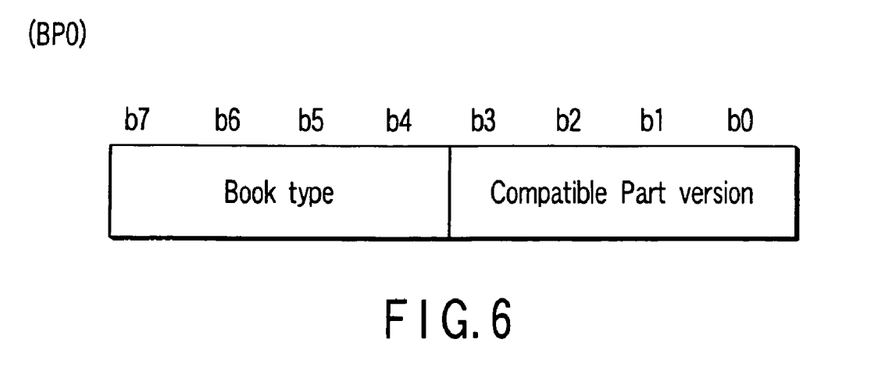
FIG. 6 shows the data structure of block position BP0 shown in FIG. 4.

In the present invention, the contents of information described in the first and second fields 111 and 112 are important. The contents of the first field 111 have been explained as "Book type and Part version field". In practice, 8 bits are assigned, as shown in FIG. 6, and are specified as follows.

Byte position 0 (BP0) describes Book type and Compatible Part version using 8 bits (b7, b6, b5, b4, b3, b2, b1, b0). More specifically, the following rules are specified.

If Book type is 0000b, it means DVD specifications for a Read-Only Disc. If Book type is 0001b, it means DVD specifications for a Rewritable Disc (DVD-RAM). If Book type is 0010b, it means DVD specifications for Recordable Disc (DVD-R). If Book type is 0011b, it means DVD specifications for a Re-recordable Disc (DVD-RW). If Book type assumes a value other than those described above (Others), it means Reserved.

If Compatible Part version is 0000b, it means Version 0.9 for test use only, not for a consumer product.

If Compatible Part version is 0001b, and byte position 27 (BP27) 00h, it means Version 1.0. If Compatible Part version is 0001b and byte position 27 (BP27) is other than 00h (Others), it means Version 1.0 and compatible, and it also means that the actual version is described in byte position 27 (BP27).

If Compatible Part version is 0010b and byte position (BP27) is 00h, it means Version 1.1. If Compatible Part version is 0010b and byte position 27 (BP27) is other than 00h (Others), it means Version 1.1 and compatible, and it also means that the actual version is described in byte position 27 (BP27).

If Compatible Part version is 0011b, it means that the Version is higher than Version 1.1 but is lower than Version 1.9, and it also means that the actual version is described in byte position 27 (BP27).

If Compatible Part version is 0100b, it means Version 1.9 for test use only, not for a consumer product.

If Compatible Part version is 0101b, it means version 2.0.

If Compatible Part version is 0110b and byte position 27 (BP27) is 00h, it means Version 2.1. If Compatible Part version is 0110b and byte position 27 (BP27) is other than 00h (Others), it means Version 2.1 and compatible, and it also means that the actual version is described in byte position 27 (BP27).

If Compatible Part version is 0111b, it means that the Version is higher than Version 2.1 but is lower than Version 2.9, and it also means that the actual version is described in byte position 27 (BP27).

If Compatible Part version is 1111b, it means that the version is described in byte position 27 (BP27).

That is, the specification that poses no problem if recording is made by the conventional recording/playback apparatus is that compatible with the disc of Version 2.1. In this case, "0110b" is recorded on the disc. If the specifications of the disc have been changed not to allow the conventional recording/playback apparatus to record, the version of the disc must be handled as a new version which is incompatible with the old version, and "0111b" is recorded on the disc.

Information meaning that the actual version is described in BP27 is defined for the following reason. That is, this information is defined to allow a new recording/playback apparatus to start a disc process from reading of this first field and interpretation of information read from the first field. Of course, the new recording/playback apparatus may start a disc process from reading of the second field and interpretation of information read from the second field. The new recording/playback apparatus provides a compatibility function for old and new discs. Hence, if it is recognized that an old disc is loaded upon interpreting information of the first field, information of the second field need not be interpreted, and it is effective in negating the time required to determine the disc version.

Figure 7:
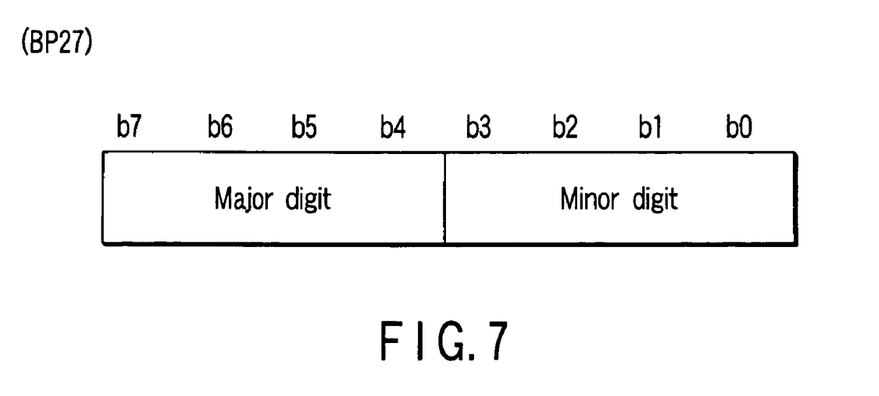
FIG. 7 shows the data structure of block position BP27 shown in FIG. 4.

The second field 112 will be described below.

Byte position 27 (BP27) describes Extended part version number using 8 bits (b7, b6, b5, b4, b3, b2, b1, b0). More specifically, the following rules are defined.

As shown in FIG. 7, the second field 112 is formed of a Major digit (Major digit of version number) and Minor digit (Minor digit of version number).

This embodiment assumes 2.2 as a new Part version. Hence, the second field 112 of a disc of version 2.2 describes "0010 0010b". Also, the second field 112 of a disc of a version which will appear in the future and is newer than version 2.2 describes information (true version information) indicating a new version.

Note that the second field 112 of a disc of a version older than version 2.2 describes 00h. That is, if the second field 112 (BP27) describes 00h, the first field 111 (BP0) describes Part version.

The contents of the second field 112 are defined as follows.

Major digit of version number . . . digit x for version number x.y

Minor digit of version number . . . digit y for version number x.y

That is, version 2.2 is defined as follows.

Major digit of version number=0010b

Minor digit of version number=0010b

If the Part version of a DVD-RAM is lower than version 2.2, the second field 112 is not defined. Hence, 00h is set in this second field 112 according to the rule of a reserved field. At this time, the first field 111 (BP0) indicates the Part Version.

This embodiment is as follows.

An optical disc of this embodiment comprises the first field 111 that records an old version number, and the second field 112 that records a new version number, so that different numbers can be set as the old and new version numbers.

The second field 112 is assured on a reserved area. If a recording/playback apparatus that recognizes the presence of the second field 112 reads 00h from the second field 112 on an arbitrary disk, it can determine that this disc is that of an old version. Even when a conventional recording/playback apparatus which does not recognize any presence of the second field 112 accepts a disc (a disc of new version) which records version information in the second field 112 on the reserved area, it ignores the reserved area, and reads the version information recorded on the first field 111 to start its operation.

Since the second field 112 is added, the upgrading rules can be changed. In addition, a new version can be defined on the basis of the new rules, and an old version can be defined based on the old rules. Even a conventional recording/playback apparatus which is incompatible with a new version can set optimal operations.

Various kinds of parameter information which can be added together with new version information are added to the reserved fields shown in FIG. 5. For example, these parameters include the write speed, write power, and the like which have been changed due to an improvement of the disc material and the like. Also, the parameters include that indicating an allowable read speed. In any case, even when a new specification is added, the rules can be set by freely utilizing the second field 112, and the version information can be described.

Figure 8:
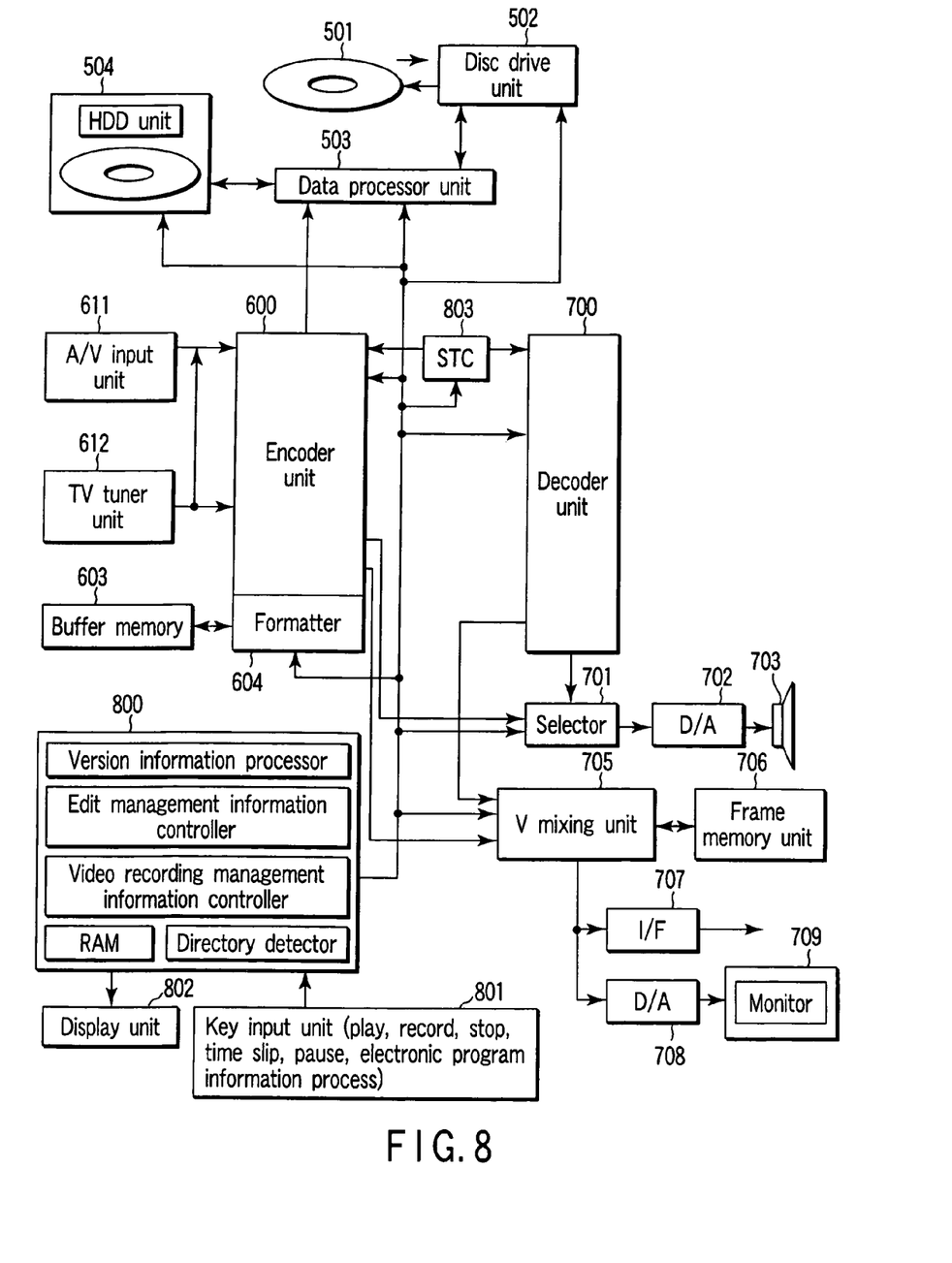
FIG. 8 is a block diagram showing an example of the arrangement of a recording/playback apparatus which records/plays back information on/from an optical disc according to the embodiment of the present invention.

FIG. 8 shows an example of a schematic arrangement of a recording/playback apparatus which can recognize the second field 112. This recording/playback apparatus has a disc drive unit 502. An optical disc 501 is an information recording medium which can form a video file. The disc drive unit 502 rotates the optical disc 501 to execute read/write access of information. A hard disc drive unit 504 drives a hard disc. A data processor unit 503 can supply recording data to the disc drive unit 502 and hard disc drive unit 504, and can receive a playback signal. The disc drive unit 502 has a rotation control system, laser drive system, optical system, and the like for the optical disc 501.

The data processor unit 503 handles data in recording or playback units, and includes a buffer circuit, modulation/demodulation circuit, error correction unit, and the like.

This recording/playback apparatus includes an encoder unit 600 which forms the video recording side, a decoder unit 700 which forms the playback side, and a microcomputer block 800 which controls the operation of the apparatus main body as principal components. The encoder unit 600 includes video and audio analog-to-digital converters for converting an input analog video signal and analog audio signal into digital signals, a video encoder, and an audio encoder. The encoder unit 600 further includes a sub-picture encoder.

The output from the encoder unit 601 is converted into a predetermined DVD-RAM format by a formatter 604 including a buffer memory 603, and is supplied to the aforementioned data processor unit 503. The encoder unit 600 receives an external analog video signal and external analog audio signal from an AV input unit 611, or an analog video signal and analog audio signal from a TV tuner 612. When the encoder unit 600 directly receives a compressed digital video signal or digital audio signal, it can directly supply a compressed digital video signal and digital audio signal to the formatter 604. The encoder unit 600 can directly supply an analog-to-digital converted digital video signal and audio signal to a video mixing unit 705 and audio selector 701.

The video encoder included in the encoder unit 600 converts a digital video signal into a digital video signal which is compressed at a variable bit rate on the basis of MPEG2 or MPEG1. A digital audio signal is converted into a digital audio signal which is compressed at a fixed bit rate on the basis of the MPEG or AC-3, or a linear PCM digital audio signal.

When a sub-picture signal is input from the AV input unit 611 (for example, when a signal or the like is input from a DVD video player with an independent output terminal of a sub-picture signal) or when a DVD video signal with such data format is broadcast and is received by the TV tuner 612, a sub-picture signal in the DVD-video signal is encoded by the sub-picture encoder (runlength-encoded) to obtain sub-picture bitmap data.

The encoded digital video signal, digital audio signal, and sub-picture data are packed by the formatter 604 to obtain video, audio, and sub-picture packs, which are further collected to be converted into a format specified by the DVD recording standard (e.g. the standard for DVD-RAM, DVD-R, DVD-RW, etc. recording).

This recording/playback apparatus can supply information (video, audio, and sub-picture data packs and the like) formatted by the formatter 604 and generated management information to the hard disc drive unit 504 or data disc drive unit 502 via the data processor unit 503, and can record them on the hard disc or optical disc 501. Also, the apparatus can record information recorded on the hard disc or optical disc on the optical disc 501 or hard disc via the data processor unit 503 and disc drive unit 502.

Also, edit processes for deleting some of video objects of a plurality of programs recorded on the hard disc or optical disc 501, joining objects of different programs, and so forth can be made. This is because the data units to be handled by the DVD format are defined to allow easy edit processes.

The microcomputer block 800 includes an MPU (microprocessing unit) or CPU (central processing unit), a ROM written with a control program and the like, and a RAM that provides a work area required upon execution of the program.

The MPU of the microcomputer block 800 executes defective location detection, non-recorded area detection, video recording information recorded position setups, UDF recording, AV address setups, and the like in accordance with the control programs stored in the ROM of the MPU using the RAM as a work area.

The microcomputer block 800 has an information processor required to control the entire system, and comprises a work RAM, directory detector, VMG (entire video management information) information generator, copy-related information detector, copy & scrambling information processor (RDI processor), packet header processor, sequence header processor, aspect ratio information processor, and the like.

Of the execution results of the MPU, the contents to be informed of the user are displayed on a display unit 802 of the video data recording/playback apparatus or are displayed on a monitor display as OSD (on-screen display) data. The microcomputer block 800 has a key input unit 801 used to input an operation signal for operating this apparatus. The control timings of the disc drive unit 502, hard disc drive unit 504, data processor 503, encoder unit 600 and/or decoder unit 700 and the like by the microcomputer block 800 can be executed based on time data from an STC (system time clock) 803. The video recording and playback operations are normally executed in synchronism with time clocks from the STC 803, but other processes may be executed at timings independent from the STC 803.

The decoder unit 700 has a separator for separating and extracting respective packs from a DVD-format signal having a pack structure, a memory used upon execution of pack separation, and other signal processes, a V decoder for decoding main-picture data (contents of video packs) separated by the separator, an SP decoder for decoding sub-picture data (contents of sub-picture packs) separated by the separator, and an A decoder for decoding audio data (contents of audio packs) separated by the separator. Also, the decoder unit 700 comprises a video processor which composites decoded sub-picture data on decoded main picture data as needed so as to superimpose and output sub-picture data such as a menu, highlight button, caption, and the like on main picture data.

The output video signal from the decoder unit 700 is input to the video mixing unit 705. The video mixing unit 705 mixes text data. The video mixing unit 705 is also connected with a line which is used to directly fetch signals from the TV tuner 612 and A/V input unit 611. A frame memory 706 serving as a buffer is connected to the video mixing unit 705. If the output from the video mixing unit 705 is an analog output, it is externally output via an I/F (interface) 707; if the output is a digital output, it is externally output via a digital-to-analog converter 708.

The output audio signal from the decoder unit 700 is converted into an analog signal by a digital-to-analog converter 702 via the selector 701, and the analog audio signal is externally output. The selector 701 is controlled by a select signal from the microcomputer block 800. In this way, the selector 701 can directly select a signal that goes through the encoder unit 600 when a digital signal from the TV tuner 612 or A/V input unit 611 is to be directly monitored.

Note that the formatter of the encoder unit 600 generates segmentation information during video recording, and periodically sends that information to the MPU of the microcomputer block 800 (information upon generation of a GOP start interrupt or the like). The segmentation information includes the number of packs of a VOBU (video object unit), the end address of I-picture from the head of a VOBU, a VOBU playback time, and the like.

At the same time, information from the aspect information processor is sent to the MPU at the beginning of video recording, and the MPU generates VOB stream information (STI). Note that STI saves resolution data, aspect data, and the like, and the respective decoders make initial setups based on this information upon playback.

This recording/playback apparatus records one video file per disc. In order to continue seamless playback while accessing (seeking) data, a minimum contiguous information unit (size) is determined. This unit is called a CDA (contiguous data area). The CDA size is a multiple of ECC (error correction code) blocks (16 sectors), and the file system performs recording for respective CDA units.

The data processor unit 503 receives data every VOBU from the formatter of the encoder unit 600, and supplies data for each CDA to the disc drive unit 502 or hard disc drive unit 504. The MPU of the microcomputer block 800 generates management information required to play back recorded data, and sends the generated management information to the data processor unit 503 upon recognition of a data recording end command. In this way, management information is recorded on the disc. Therefore, the MPU of the microcomputer block 800 receives information associated with data units (segmentation information and the like) from the encoder unit 600 during encoding. Also, the MPU of the microcomputer block 800 recognizes management information (file system) read from the optical disc and hard disc at the beginning of recording, recognizes an unrecorded area of each disc, and sets a recording area on data on a disc via the data processor unit 503.

Figure 9:
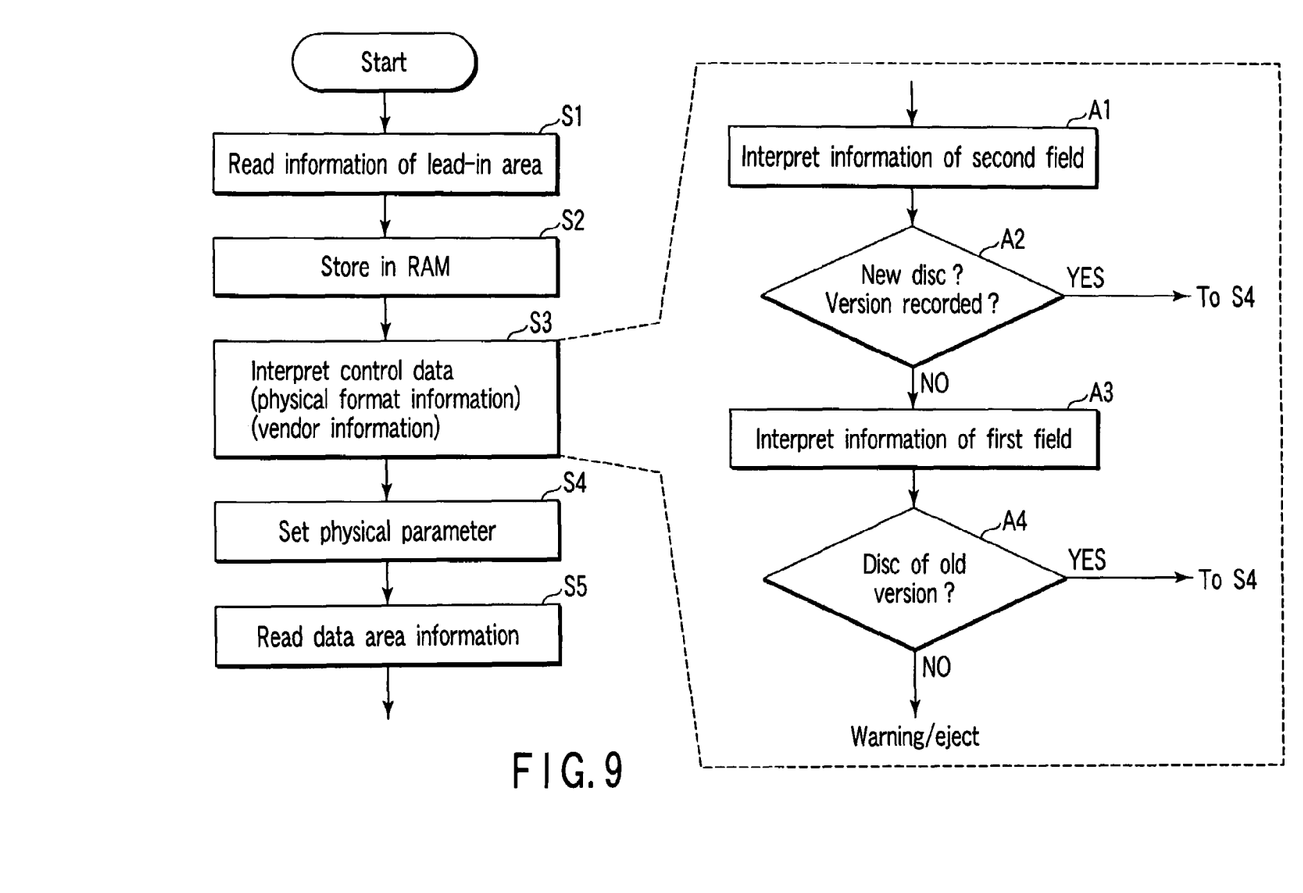
FIG. 9 is a flowchart for explaining an example of the operation of the recording/playback apparatus shown in FIG. 8.
Figure 10:
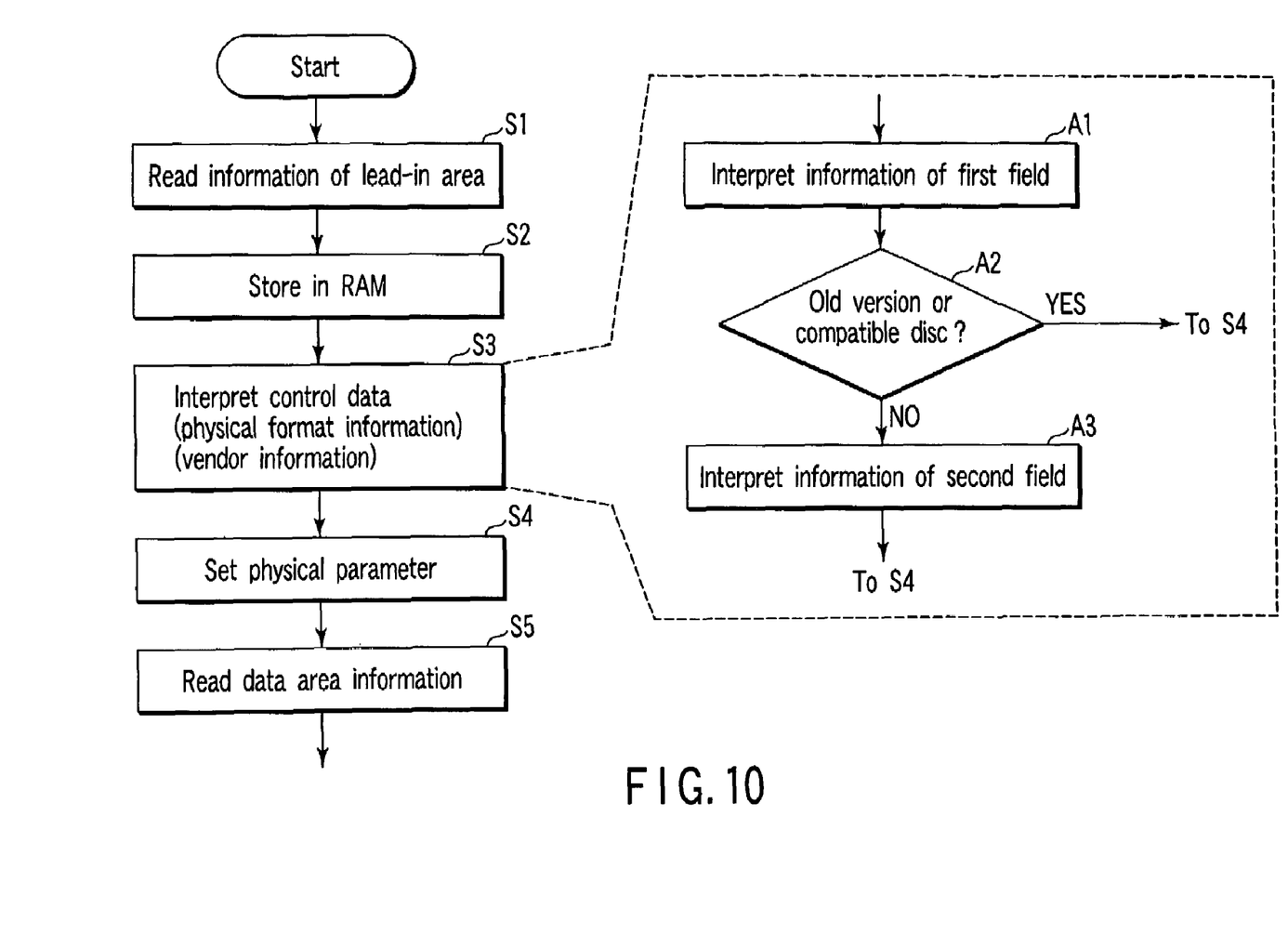
FIG. 10 is a flowchart for explaining an example of the operation of the recording/playback apparatus shown in FIG. 8.

The microcomputer block 800 includes a version information processor which interprets version information, and sets physical parameters of the disc drive unit 502 on the basis of the interpreted version information. FIGS. 9 and 10 are flowcharts showing an example of the operation of the version information processor in a new recording/playback apparatus. When an optical disc is loaded and disc information begins to be read for the purpose of recording or playback, information of the lead-in area is read (step S1). The read information is temporarily stored in the RAM, and control data is then interpreted (steps S2 and S3). After the disc version is detected, physical parameters are determined to allow to read information from a data area or to write information on the data area (steps S4 and S5).

In step S3, the physical format information is processed as follows. More specifically, the information of the second field 112 is interpreted to determine if a disc in access is a new disc (a disc of a new version) (steps A1 and A2). If the disc in access is a new disc, the flow advances to step S4. If the disc in access is not a new disc, the information of the first field 111 is interpreted to check if that disc is a disc of an old version (steps S3 and S4). If that disc is of old version, the flow advances to step S4; if that disc is an unknown disc, a warning or ejection process is executed.

In the aforementioned example, the information of the second field 112 is interpreted first upon interpreting control data. However, information of the first field 111 may be interpreted first, as shown in FIG. 10. That is, in step A1 the information of the first field 111 is interpreted to check if a disc is of old version or is an incompatible disc (step A2). If the disc is of an old version, the flow advances to step S4; otherwise, the information of the second field 112 is interpreted. If it is determined that the disc is an old or incompatible disc, newly added specifications cannot be recognized. If this drive does not support added specifications, this processing method requires little change from the conventional drive and can reduce the developing cost. Other steps are the same as those in FIG. 9 above.

As described above, according to the present invention, since a new field is assured, even when discs of new versions are developed continuously, version information can be added. Also, a recording/playback apparatus which can support this new version can be easily manufactured. Note that a disc of a new version is developed when a new copy protection scheme is added, when the playback speed is increased due to improved machine characteristics, when the recording density is improved, or when the recording response speed is improved due to improvements in materials used in a recording unit. Also, improvements in laser beam power and beam diameter may often result in the birth of a new version.

By adopting the aforementioned disc, even when a new disc is upgraded irrespective of its compatibility (commonality) with a conventional disc, such disc is compatible with new and old recording/playback apparatuses using a plurality of pieces of version information recorded on the first and second fields 111 and 112. That is, by adopting the aforementioned disc, the version can be changed based on new rules without influencing a drive that operates based on old rules. Hence, the drive can accurately determine the disc specifications based on the version number. The standard becomes easy to understand, and drives and discs that violate the standard are hardly manufactured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disc comprising:
   a first field to record first version information; and
   a second field to record second version information obtained by updating the first version information,
   wherein the first version information is 4-bit information, and the version information is 8-bit information.

2. A disc according to claim 1, wherein the first version information is information indicating compatibility, and
   the second version information is information indicating a true version.

3. A disc according to claim 1, further comprising a lead-in area,
   the lead-in area including a control data zone that records physical format information, and
   the control data zone including the first and second fields.

4. An information playback apparatus for playing back information from an optical disc comprising a first field to record first version information indicating a compatible first version disc; a second field to record second version information indicating a second version disc obtained by updating the first version information; and physical parameter fields to record first physical parameters for the first version disc and second physical parameters for the second version disc, comprising:
   a read unit configured to read information from the first and second fields;
   an interpretation unit configured to interpret the information read by the read unit; and
   a setting unit configured to set the first physical parameters and the second physical parameters, if it is determined that the information read from the second field represents the second version information.

5. An apparatus according to claim 4, wherein the setting unit sets the first physical parameters when it is determined that the information read from the second field does not represent the second version information, and it is determined that the information read from the first field represents the first version information.

6. An information playback method for playing back information from an optical disc comprising a first field to record first version information indicating a compatible first version disc; a second field to record second version information indicating a second version disc obtained by updating the first version information; and physical parameters fields to record first physical parameters for the first version disc and second physical parameters for the second version disc, comprising:
   reading information from the first and second fields;
   interpreting the read information; and
   setting, if it is determined that the information read from the second field represents the second version information, the first physical parameters and second physical parameters.

7. A method according to claim 6, further comprising setting physical parameters based on the first physical parameters when it is determined that the information read from the second field does not represent the second version information, and it is determined that the information read from the first field represents the first version information.

8. An information recording method for recording information on an optical disc comprising a first field to record first version information indicating a compatible first version disc; a second field to record second version information indicating a second version disc obtained by updating the first version information; and physical parameters fields to record first physical parameters for the first version disc and second physical parameters for the second version disc, comprising:
   reading information from the first and second fields;
   interpreting the read information; and
   setting, if it is determined that the information read from the second field represents the second version information, the first physical parameters and second physical parameters.

9. A method according to claim 8, further comprising setting physical parameters based on the first physical parameters when it is determined that the information read from the second field does not represent the second version information, and it is determined that the information read from the first field represents the first version information.

* * * * *

UNITED STATES PATENT AND TRADEMARK OFFICE
CERTIFICATE OF CORRECTION

PATENT NO.        : 7,369,475 B2                                           Page 1 of 1
APPLICATION NO.   : 10/988572
DATED             : May 6, 2008
INVENTOR(S)       : Koichi Nagai It is certified that error appears in the above-identified patent and that said Letters Patent is hereby corrected as shown below:

What is claimed is:
Claim 1, Column 13, line 7, after "the" insert --second--

Signed and Sealed this
Sixth Day of December, 2011

David J. Kappos
*Director of the United States Patent and Trademark Office*